Figure 1:
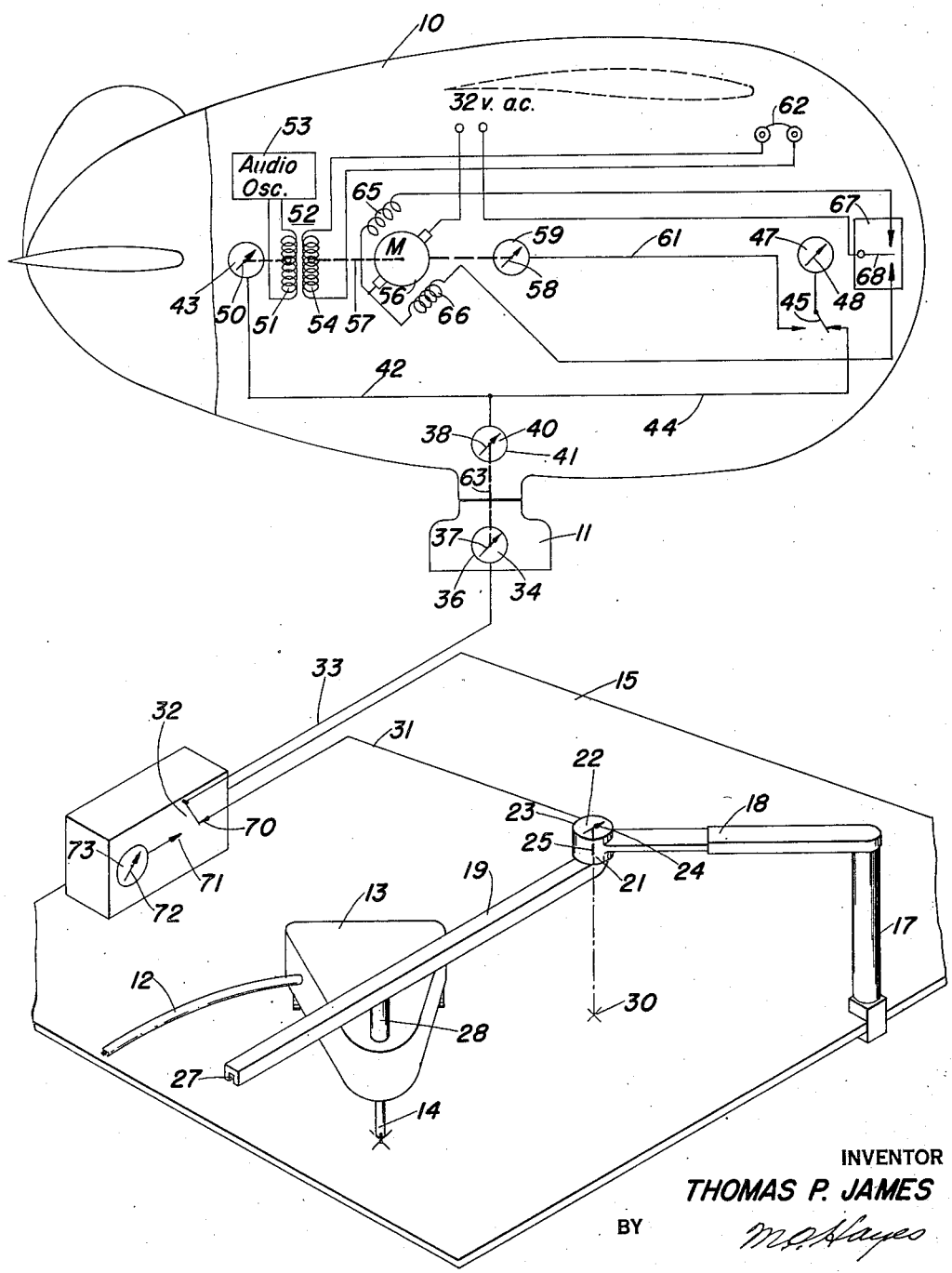

July 7, 1953

T. P. JAMES 2,644,247

RADIO NAVIGATION TRAINER

Filed Jan. 10, 1946

2 Sheets-Sheet 1

INVENTOR
THOMAS P. JAMES
BY
*M.P.Hayes*
ATTORNEY

July 7, 1953 T. P. JAMES 2,644,247
RADIO NAVIGATION TRAINER
Filed Jan. 10, 1946 2 Sheets-Sheet 2

INVENTOR
THOMAS P. JAMES
BY
ATTORNEY

UNITED STATES PATENT OFFICE 2,644,247

RADIO NAVIGATION TRAINER

Thomas P. James, United States Navy, Alameda, Calif.

Application January 10, 1946, Serial No. 640,290

6 Claims. (Cl. 35—10.2)

(Granted under Title 35, U. S. Code (1952), sec. 266)

This invention relates to a training device, and more particularly to apparatus for training personnel in the use of radio navigation aids.

For training personnel in the operation of vessels, particularly aircraft, there has been devised a simulated airplane containing many of the controls found in a real airplane, and known in the art as a Link trainer. This device comprises essentially a small carrier having a cockpit adapted to hold a human operator. Within the cockpit, and facing the operator, is a panel containing most, if not all, of the instruments and controls found in a real airplane. The carrier, simulating the airplane, is rotatably mounted on a base; so that it may be swung around in any direction by manipulation of the controls, just as an airplane may be pointed in any direction.

A concomitant of the carrier is a training board or table, generally under the constant supervision of an instructor. Over the surface of the training board moves a traveler, or automatic recording device, having three wheels which may be turned in any direction. Such a traveler is commonly known as a "crab." From the carrier, the traveler receives electrical signals of such nature that it is driven and turned over the training board along a path simulating what would be the travel of the carrier, were the latter a real airplane. One of the three wheels of the traveler is generally inked, so that a continuous, permanent record of the simulated travel of the carrier may be made on a map spread over the training board.

In a real airplane, certain direction-finding radio aids are usually incorporated. One such aid comprises a directional loop antenna mounted on the plane and rotatable at the will of an operator within the plane. In use, the operator turns the loop toward a radio station having a certain identifiable signal. An instrument on the airplane panel shows the direction in which the loop is pointed. When a "null" is obtained in his earphones, the operator may read from the instrument the relative bearing of that particular station with respect to his plane.

As a relative bearing of the station from the plane changes, it is necessary for the operator to change the position of the loop, so as to maintain a constant null in his earphones, in order that the bearing indication shown on his panel instrument may be always correct. The manual operation as described above is known in the art as radio direction finding or RDF.

An improvement over RDF consists of means effective to maintain automatically the loop at the null bearing, by constantly pointing it in the direction of the station, once it has been placed on the correct bearing by manual operation. This system is known as automatic direction finding, or ADF.

Previous Link trainers have incorporated an ADF indicator on the panel of the carrier. This indicator has been, in the past, actuated by remote, manually-operable means from the training board under the supervision of an instructor.

It is advantageous to provide automatic transmission of bearing signals to the carrier; and it is also advantageous to provide a means whereby the operator who is being trained may manipulate controls in a manner simulating RDF operation; so that training in RDF, as well as ADF, may be provided.

Accordingly, it is an object of this invention to provide means for transmitting simulated bearing signals from a traveler, or "crab," to an instrument on the panel of a training carrier.

It is another object of this invention to provide means for automatically producing a signal which is a function of the bearing between a traveler on a training board and a predetermined point on the training board representing a radio station; and for utilizing the signal to indicate the bearing on an instrument on the panel of a carrier simulating a vessel, such as an airplane.

It is a further object of this invention to provide in a carrier simulating an aircraft, apparatus by means of which operation of a directional antenna to obtain a null may be practiced by a student operator.

It is still a further object of this invention to provide means whereby a simulated bearing between an airplane and a radio station may be produced by a traveler representing the airplane; and this bearing information transmitted into a carrier, where it is applied to apparatus simulating operation of a radio direction-finding loop, whereby an operator in the carrier may practice the operational steps of using radio navigation aids such as are encountered in an actual airplane.

Figure 2:
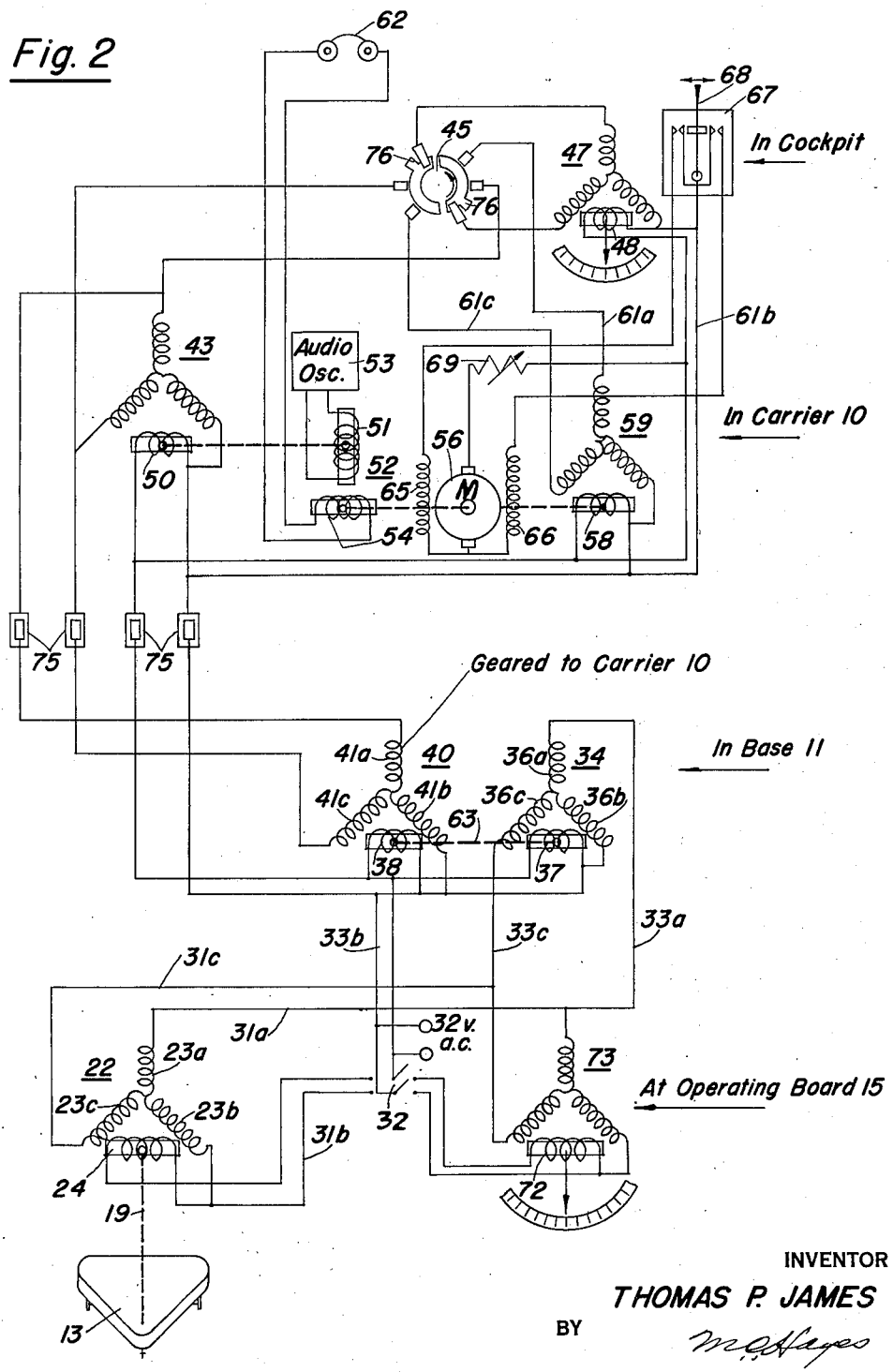

In accomplishing these and other objects of the present invention, I have provided improved details of structure, the preferred form of which is illustrated in the accompanying drawings, wherein:

Fig. 1 is a partly schematic view of apparatus constructed according to the preferred embodiment of my invention, and Fig. 2 is a wiring diagram illustrating in more detail the electric circuits employed in the apparatus of Fig. 1.

The term "relative bearing" used herein means the direction of a transmitter from, or with respect to, the bow or heading of the aircraft, and irrespective of the compass direction. "True bearing" means the direction as read on the compass, irrespective of the heading of the aircraft. For example, a transmitter due east (i. e. 90°) of an aircraft pointed in a southeast (i. e. 135°) direction would have, with respect to the craft, a relative bearing of 315°, and a true bearing of 90°.

The preferred form of apparatus embodying this invention comprises a carrier, simulating an airplane, rotatable on a base, and having a cockpit in which an operator may sit. Near the base is provided a training board, generally in the form of a table, to which may be secured a map of any given area. Over the training board moves a traveler, powered and guided in accordance with signals from the carrier. The traveler is so energized that it moves over a path corresponding to the simulated travel of the airplane represented by the carrier. Thus, an instructor sitting beside the training board may know where the student operator is navigating the airplane.

In order to produce positional signals corresponding to the bearing between a radio station and the airplane, a rotatable arm is mounted on a carrying head held over the training board, the other end of the arm being slidably and pivotally connected to the traveler. Through a position transmitting device located in the carrying head and actuated by the arm, signals are produced which are always a function of the bearing between the traveler, representing the airplane, and the carrying head, representing the radio station.

These signals are sent to the carrier, where they actuate a position receiving device, connected to the rotatable primary winding of a transformer. The secondary winding of the transformer, which is also rotatable thru an operator-controlled motor, is connected to another position transmitting system; so that an indicating instrument on the panel of the carrier always shows the position of the secondary winding of the transformer, which simulates the loop antenna of a real airplane.

The rotational position of the primary winding of the transformer always corresponds to the simulated relative bearing of the radio signal which would be received in a real airplane. By turning the secondary winding of the transformer until a null is perceived in his earphones, the operator may be appraised of the simulated relative bearing between the radio station and his plane, said bearing being indicated by the instrument on his panel.

Referring more in detail to the drawings:

In Fig. 1 there is shown a carrier 10 having a cockpin, not shown, in which a student operator may sit. Carrier 10 rotates in a horizontal plane on base 11. By manipulating levers within the carrier, the operator produces electrical signals corresponding to the speed, bearing, rate of turn and other data concerning the simulated flight of the airplane.

The turning signals thus produced actually operate to turn carrier 10 on base 11; while the turning and speed signals are transmitted through a cable 12 to a traveler 13, known formally as a "trainer automatic recorder" and informally as a "crab." Traveler 13 moves over a training board 15, which is generally under the observation of an instructor. One of the wheels 14 of traveler 13 is inked, and represents the instantaneous position of the plane simulated by carrier 10. In operation, the ink line traced by wheel 14 gives a picture of the course pursued by the airplane.

In order to introduce simulating of radio navigation aids, particularly radio direction finders, there is provided a vertical post 17 extending upward from the edge of board 15. On the upper end of post 17 and rotatable thereon is an extensible, telescoping arm 18. At the end of arm 18, remote from post 17, is a rotatable arm 19 pivoted about arm 18 at point 21.

In the end of arm 18, is mounted a position transmitting device 22 having an outside member 23 and an inside rotatable member 24. Position transmitting device 22 may be of any one of a number of forms of devices known in the art. All of these devices have the common features of a pair of electrical windings rotatable with respect to each other. In common use, one of the windings is generally maintained stationary, and is known as the stator; while the other is rotated with respect thereto, and is known as the rotor. Electrical signals, peculiar to the particular position of the rotor with respect to the stator, are generated by the device, and transmitted to a similar device, also having a rotor and stator, which receives the electrical signals to cause its rotor to assume a position with respect to its stator exactly corresponding to the relative positions of the rotor and stator in the position transmitting device. The second device thus operates as a position receiving device. It is to be understood that, per se, the two devices may be identical. It will also be understood that, although one of the rotatable members is referred to as a stator and the other as a rotor, it is quite possible that both may be rotatable with respect to a given mounting means. In any event, the electrical signals transmitted by such a position transmitting device are a function of the relative rotational position of the rotor with respect to the stator.

Returning to Fig. 1, position transmitting device 22 has its stator 23 mounted in the end of arm 18. The rotational position of stator 23 may be fixed relative to arm 18 as shown; or, stator 23 may be manually rotatable with respect to the arm 18. Rotor 24 of position transmitting device 22 is geared, as represented by dashed line 25, to arm 19; so that rotation of arm 19 with respect to arm 18 is transmitted as rotation of rotor 24 with respect to stator 23. The arm 19 has a groove 27 in the bottom thereof, in which may slide the upper end of a post 28 located on traveler 13 preferably over the inked wheel 14.

Thus traveler 13 is free to move over board 15 in accordance with driving signals derived from carrier 10; and at the same time it actuates, through post 28, arm 19, so that rotor 24 continuously occupies a position directly correlated with the bearing between wheel 14 and point 30, directly under pivot point 21, representing the location of a radio station transmitting radio direction finding signals.

The positioning signals produced by rotor 24 are transmitted by an electrical connection 31, two-way switch 32, and electrical connection 33, to a position receiving device 34 located in base 11. Stator 36 of position receiving device 34 is fixed with respect to base 11, while rotor 37 thereof is connected by means of a mechanical linkage 63, such as a shaft or gearing, to rotor 38 of another position transmitting device 40.

Stator 41 of position transmitting device 40 is preferably located in base 11, but is connected so as to be rotated by carrier 10; and for this reason has been shown in schematic diagram Fig. 1 as located in the body of carrier 10. Electrical signals corresponding to the position of rotor 38 are applied thru electrical connection 42 to a position receiving device 43, and thru electrical connection 44 to a two-way switch 45. With switch 45 in the position shown, relative bearing information is transmitted directly to a position receiving device 47, the rotor 48 of which actuates a pointer on a panel instrument, from which the student operator may read the relative bearing of his plane with respect to radio station 30. This position of switch 45 effectuates simulation of automatic direction finding (ADF), and the operator does not need to simulate operation of a loop antenna in order to obtain his relative bearing indication.

With switch 45 in the other position, bearing information is channeled only through electrical connection 42 and position receiving device 43. Rotor 50 of position receiving device 43 is connected to primary winding 51 of transformer 52, so that the two will turn synchronously. Winding 51 is energized with audio frequency signals by an audio oscillator 53. In the secondary winding 54 of transformer 52 are induced corresponding audio signals, the strength of which will depend upon the relative rotational position of secondary winding 54 with respect to primary winding 51. Winding 54 is connected to be rotated by a motor 56, by means of shafting or gearing represented by dashed line 57. Motor 56 similarly actuates rotor 58 of a position transmitting device 59. Positioning signals are sent to position receiving device 47 through connection 51 and switch 45 (when thrown to the left hand position). Thus, when the operator has rotated winding 54 to obtain a null in earphones 62, he may read from his panel instrument 47 the relative position of station 30 with respect to the position of his plane 14.

To retrace the circuit briefly, the bearing indication originates with arm 19 connecting point 14 of traveler 13 with position transmitting device 22 located directly over radio station 30. Rotor 37 of position receiving device 34 positions itself according to the position of rotor 24, by virtue of the electrical signals sent through connections 31 and 33. Rotor 37 is effective to position rotor 38 of position transmitting device 40 through mechanical linkage 63. Rotor 50 of position receiving device 43 is positioned by the electrical signals traveling over connection 42. By obtaining a null in earphone 62, the operator may produce matching in position between windings 51 and 54 of transformer 52, thus causing rotor 58, of position transmitting device 59, to match the position of rotor 50. Finally, electrical connection 51 effectuates correspondence between the positions of rotor 58 and rotor 48, of position receiving device 47. Whereas the bearing indication originating with arm 19 is a true bearing, it is converted to a relative bearing by the action of position transmitting device 40 which has its stator 41 geared to rotate synchronously with carrier 10.

It is thus seen that as long as a null is maintained in earphones 62 by proper attention to the position of winding 54, the relative bearing between the airplane position 14 and the radio station 30 is always indicated by the indicating pointer attached to rotor 48. If it is desired to omit simulation of manual operation of the loop antenna, switch 45 may be thrown to the right (the position shown) and relative bearing will be indicated automatically by the pointer attached to rotor 48.

Motor 56 is caused to rotate in either direction by the selective connection of either field 65 or field 66 energized at the will of the operator thru a switch 67, the central connection 68 of which is connected to a switch handle on the panel of carrier 10. Variable resistor 69 (Fig. 2) is operative to permit manual setting of speed for motor 56.

If desired, the bearing signals may be introduced manually by throwing the switch 32 from contact 70 to contact 71. In this case, manual positioning of rotor 72 of position transmitting device 73 by the instructor determines the position assumed by rotor 48 of position receiving device 47 in the cockpit.

Referring now to Fig. 2, a more detailed wiring diagram of the circuits employed in the apparatus schematically illustrated in Fig. 1 is shown. The Y connected windings represent stator members of position transmitting devices or position receiving devices, as the case may be. The rotatable armatures beneath each Y represent the respective rotors. Reference numerals used in the explanation of Fig. 1 have been duplicated in Fig. 2. Where an electrical connection in Fig. 1 has been shown as a single line, a plurality of wires may actually be used, in which case identifying letters follow the reference numerals.

Brushes 75 constitute conventional means for conveying electrical signals between the base, which is stationary, and the carrier, which may be rotated thereon as many times as desired. Similarly, it is to be understood that the rotors in the position transmitting devices and the position receiving devices also have some type of slip connection permitting them to be rotated as many times as desired with respect to the stators.

Switch 45 is illustrated in Fig. 2 as having three positions, the first of which is the "off" position shown. One counter-clockwise step rotates tabs 76 of switch 45 so that position receiving device 47 is connected to position transmitting device 40. This connects the apparatus for simulating ADF operation, in which the student operator does not have to control the radio antenna loop. This position corresponds to the right hand position of switch 45 as illustrated in Fig. 1.

The second counter-clockwise rotational step on switch 45 connects position transmitting device 59 with position receiving device 47, thereby connecting the circuit for RDF, in which manual supervision of the antenna loop by the operator is required. This corresponds to the left hand position of switch 45 in Fig. 1.

Transformer 52 consists of an outside winding and inside winding; the two windings being rotatable with respect to each other. The transformer assembly resembles closely a two pole motor, in which both rotor and stator may be turned with respect to a stationary mounting means. As with the rotors of the position transmitting devices and position receiving devices, slip connection means are provided so that continuous rotation of windings 51 and 54 is possible. With such a device, there are two positions in each 360° rotation where substantially no signal will be induced in the secondary winding by the continuous audio signal in the primary winding. These two positions correspond to the nulls, thus simulating closely the actual operation of a direction finding loop antenna.

Operation

A student operator enters carrier 10 (Fig. 1), closing the top so that he must depend on his panel instruments to know in what direction he is traveling. The instructor, seated beside operating board 15, arbitrarily places traveler 13 over any spot on the board. The direction in which the wheels of traveler 13 point is determined by the bearing of carrier 10 on base 11. The student manipulates the controls in carrier 10, causing the "airplane" to "fly" over any course desired. Wheel 14 of traveler 13 plots this course in accordance with the speed and direction signals obtained from carrier 10 through cable 12.

Assuming RDF operation controlled by traveler 13 is desired, switch 32 is in the position shown in Fig. 1 and switch 45 is thrown to the left. The operator, while listening through earphones 62, rotates secondary winding 54 of transformer 52 until a null is obtained. Instrument rotor 48 then gives him the bearing of station 30 with respect to his plane (point 14). As with a real loop antenna, there is possibility of ambiguity of 180° in the reading indicated by rotor 48. To resolve this ambiguity the operator flies along a course originally bearing 90° from station 30. Depending on whether the station bearing moves forward or back, he will then know whether his bearing is as shown by rotor 48 or whether he must rotate winding 54 through 180° to obtain the correct bearing. Once the correct bearing is obtained, the operator is fully aware of his position insofar as bearing with respect to radio station 30 is concerned.

Ancillary to the above described radio direction finding apparatus, there is generally incorporated in the trainer, apparatus simulating the conventional A-N system of navigation using directional antennas at the radio station. It is obvious that, if desired, use of arm 19 in connection with a position transmitting device may be duplicated to transmit automatically the bearing between a traveler and a simulated radio station sending out A-N signals.

From the above description, it will be evident that there has been described apparatus for training personnel in the use of radio navigation aids having the novel features of means for automatically transmitting simulated bearing signals to a carrier representing an airplane; and apparatus within the carrier permitting duplication of the operation which a navigator must go through in a real vessel in order to obtain radio direction by means of a directional antenna.

While I have shown but one embodiment of my invention, it is susceptible to modification without departing from the spirit of the invention. I do not wish, therefore, to be limited by the disclosure set forth, but only by the scope of the appended claims.

The invention described herein may be manufactured and used by or for the Government of the United States of America for governmental purposes without the payment of any royalties thereon or therefor.

I claim:

1. Apparatus for training personnel in the use of radio navigation aids comprising a base, a carrier simulating a vessel, rotatably mounted on said base, and adapted to carry a human operator, an operating board having a substantially plane surface and mounted substantially stationary with respect to said base, a traveler effective to move over said surface along a path representing the simulated travel of said vessel, a first position transmitting device having a first member and a second member, said members being rotatable with respect to each other, mounting means effective to position said first member adjustably in a plane substantially parallel to the plane of said surface, a rotatable arm pivoted about an axis simulating a radio station, connecting means effective to translate rotation of said arm to said second member, coupling means pivotally and slidably connecting said traveler and said arm whereby relative angular position between the two members of said first position transmitting device represents true bearing of said station from said vessel, a first position receiving device connected to said first position transmitting device and having a first member and a second member, said members being rotatable with respect to each other, said first member of said first position receiving device being mounted fixedly with respect to said base, said second member of said first position receiving device being effective to assume a position corresponding to the position of the second member of said first position transmitting device, a second position transmitting device having a first member and a second member, said members being rotatable with respect to each other, the first member of said second position transmitting device being physically connected to the second member of said first position receiving device so as to rotate therewith, the second member of said second position transmitting device being physically connected to said carrier so as to rotate therewith whereby relative angular position between the two members of said second position transmitting device represents relative bearing of said station from said vessel, a second position receiving device connected to said second position transmitting device and having a rotatable member effective to assume a position corresponding to the position of the first member of said second position transmitting device, a transformer having a first winding and a second winding, said winding being rotatable with respect to each other, signal producing means electrically connected to one of said windings and effective to energize said one winding, signal receiving means electrically connected to the other of said windings and effective to derive a signal therefrom, a third position transmitting device having a rotatable member, means effective to rotate said first winding in accordance with rotation of the rotatable member of said second position receiving device, means operable by the operator and effective to rotate simultaneously said second winding and the rotatable member of said third position transmitting device thereby simulating operation of a direction finding antenna, and a third position receiving device connected to said third position transmitting device and having a rotatable member effective to assume a position corresponding to the position of the rotatable member of said third position transmitting device.

2. Apparatus for training personnel in the use of radio navigation aids comprising a base, a carrier simulating a vessel, rotatably mounted on said base, and adapted to carry a human operator, a training board having a substantially plane surface and mounted substantially stationary with respect to said base, a traveler effective to move over said surface along a path representing the simulated travel of said vessel, a first position transmitting device having a rotatable member, a rotatable arm, connecting means effective to translate rotation of said arm to the rotatable member of said first position transmitting device, coupling means pivotally and slidably connecting said traveler and said arm, a first position receiving device having a rotatable member effective to assume a position corresponding to the position of the rotatable member of said first position transmitting device, signal translating means having a first member and a second member, said members being rotatable with respect to each other, signal generating means connected to one of said members of said translating means, signal receiving means connected to the other of said members of said translating means, means effective to rotate the first member of said signal translating means in accordance with the position of the rotatable member of said first position receiving device, a second position transmitting device having a rotatable member, means operable by the operator and effective to rotate simultaneously the second member of said signal translating means and the rotatable member of said second position transmitting device, and a second position receiving device having a rotatable member effective to assume a position corresponding to the position of the rotatable member of said second position transmitting device.

3. Apparatus for training personnel in the use of radio navigation aids comprising a base, a carrier rotatably mounted on said base and adapted to carry a human operator, a first position transmitting device having a rotatable member, a first position receiving device having a rotatable member effective to assume a position corresponding to the position of the rotatable member of said first position transmitting device, a transformer having a first winding and a second winding, said windings being rotatable with respect to each other, signal producing means electrically connected to one of said windings and effective to energize said one winding, signal receiving means electrically connected to the other of said windings and effective to derive a signal therefrom, a second position transmitting device having a rotatable member, means effective to rotate said first winding in accordance with rotation of the rotatable member of said first position receiving device, a motor having its shaft connected to said second winding and the rotatable member of said second position transmitting device, an energizing circuit for said motor, switch means in said circuit operable to effect rotation of said motor in either direction, and a second position receiving device having a rotatable member effective to assume a position corresponding to the position of the rotatable member of said second position transmitting device.

4. Apparatus for training personnel in the use of radio navigation aids comprising a base, a carrier rotatably mounted on said base and adapted to carry a human operator, a first position transmitting device having a rotatable member, a first position receiving device having a rotatable member effective to assume a position corresponding to the position of the rotatable member of said first position transmitting device, a transformer having a first winding and a second winding, said windings being rotatable with respect to each other, signal producing means electrically connected to one of said windings and effective to energize said one winding, signal receiving means electrically connected to the other of said windings and effective to derive a signal therefrom, a second position transmitting device having a rotatable member, means effective to rotate said first winding in accordance with rotation of the rotatable member of said first position receiving device, means operable by the operator and effective to rotate simultaneously said second winding and the rotatable member of said second position transmitting device, and a second position receiving device having a rotatable member effective to assume a position corresponding to the position of the rotatable member of said second position transmitting device.

5. In an aviation ground trainer having controls adapted to be manipulated by the student during a simulated flight, said trainer being adapted to directionally control a flight recorder movable over a chart relative to a radio station point indicated thereon, an indicating device comprising a first self-synchronous unit having one rotatable element mechanically coupled to said trainer so as to be positioned in accordance with the directional heading thereof and having a second rotatable element, means under control of the instructor to position said second rotatable element in accordance with the observed bearing of the recorder relative to the radio station point on the chart, a second self-synchronous unit electrically coupled to said first self-synchronous unit and having a rotatable element the rotative position of which corresponds at all times to the relative displacement of the two rotatable elements of said first self-synchronous unit, an electrical signal generator adapted to make aural signals in a receiver, a signal receiver in the trainer for the use of the student, inductive coupling means connecting said signal generator to said signal receiver and including two relatively movable coupling units, means connecting one of said coupling units with the rotatable element of said second self-synchronous unit, means under the control of the student for positioning the other of said coupling units in a position such that a minimum aural signal is transmitted from said signal generator to said signal receiver, and radio compass indicating means in the trainer actuated by the means under the control of the student.

6. In an aviation ground trainer having controls adapted to be manipulated by the student during a simulated flight, said trainer being adapted to directionally control a flight recorder movable over a chart relative to a radio station point indicated thereon, an indicating device comprising a first self-synchronous unit having one rotatable element mechanically coupled to said trainer so as to be positioned in accordance with the directional heading thereof and having a second rotatable element, means to position said second rotatable element in accordance with the bearing of the recorder relative to the radio station point on the chart, a second self-synchronous unit electrically coupled to said first self-synchronous unit and having a rotatable element the rotative position of which corresponds at all times to the relative displacement of the two rotatable elements of said first self-synchronous unit, an electrical signal generator adapted to make aural signals in a receiver, a signal receiver in the trainer for the use of the student, inductive coupling means connecting said signal generator to said signal receiver and including two relatively movable coupling units, means connecting one of said coupling units with the rotatable element of said second self-synchronous unit, means under the control of the student for positioning the other of said coupling units in a position such that a minimum aural signal is transmitted from said signal generator to said signal receiver, and radio compass indicating means in the trainer actuated by the means under the control of the student.

THOMAS P. JAMES.

References Cited in the file of this patent

UNITED STATES PATENTS

| Number | Name | Date |
|---|---|---|
| 2,164,412 | Koster | July 4, 1939 |
| 2,226,726 | Kramer | Dec. 31, 1940 |
| 2,321,799 | Cone | June 15, 1943 |
| 2,326,764 | Crane | Aug. 17, 1943 |
| 2,346,693 | Lyman | Apr. 18, 1944 |
| 2,358,793 | Crane | Sept. 26, 1944 |
| 2,366,603 | Dehmel | Jan. 2, 1945 |
| 2,399,885 | Noxon | May 7, 1946 |
| 2,416,727 | Adjordan | Mar. 4, 1947 |
| 2,418,834 | Hartman | Apr. 15, 1947 |
| 2,438,126 | Muller | Mar. 23, 1948 |
| 2,448,544 | Muller | Sept. 7, 1948 |
| 2,450,240 | Kail | Sept. 28, 1948 |
| 2,460,305 | Muller | Feb. 1, 1949 |
| 2,485,331 | Stuhrman | Oct. 18, 1949 |

OTHER REFERENCES

Air Corps News Letter, volume 21, No. 6, March 15, 1938; pages 7 and 8.